United States Patent Office 3,194,688
Patented July 13, 1965

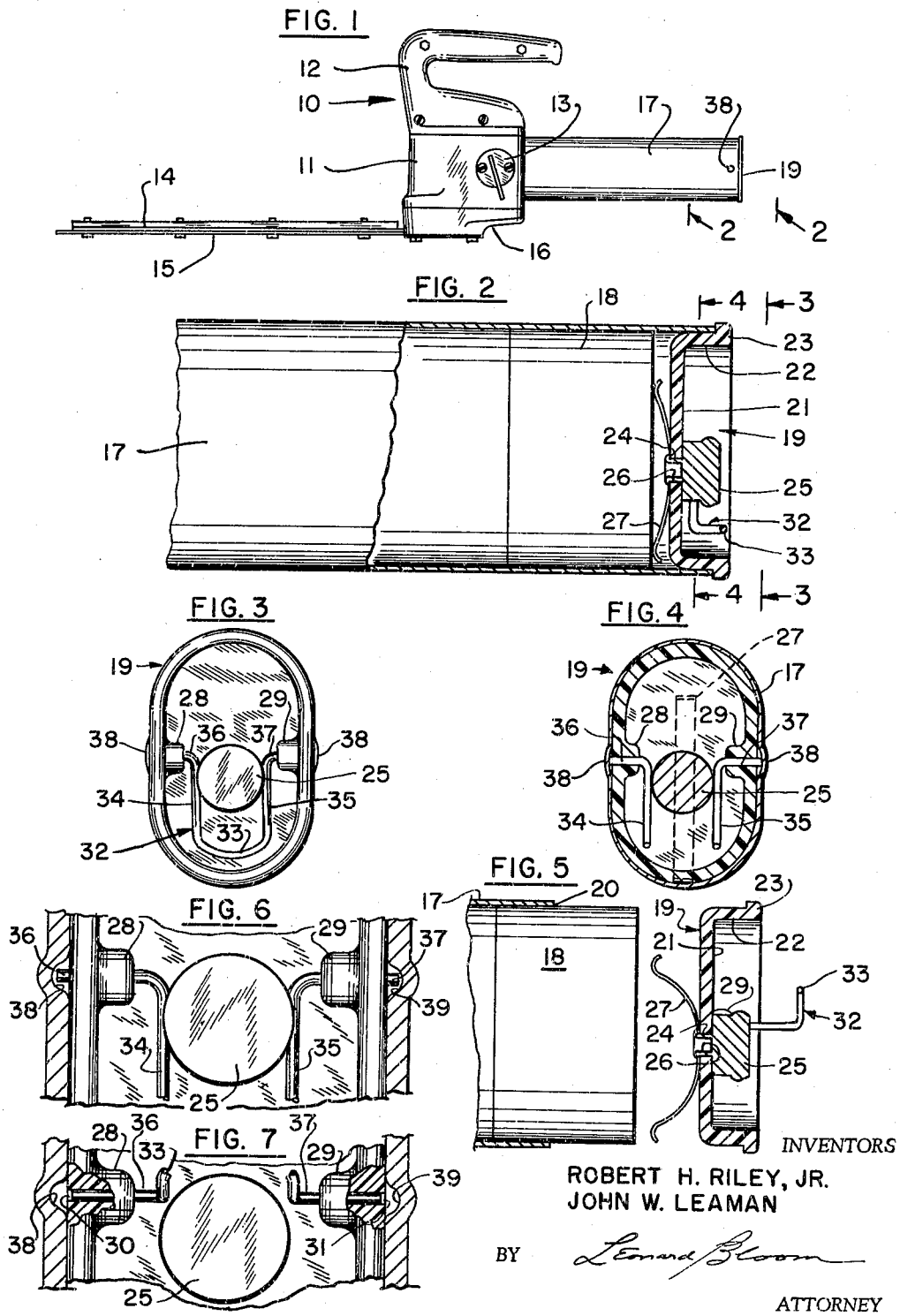

3,194,688
END PORTION CONSTRUCTION FOR HANDLE OF CORDLESS ELECTRIC DEVICE HAVING A SLIDE-OUT BATTERY PACK
Robert H. Riley, Jr., Towson, and John W. Leaman, Baltimore, Md., assignors to The Black and Decker Manufacturing Company, Towson, Md., a corporation of Maryland
Filed Mar. 5, 1962, Ser. No. 177,467
2 Claims. (Cl. 136—173)

The present invention relates to the end portion construction for the handle of a cordless electric device having a slide-out battery pack, and more particularly, to such a construction which will facilitate a rapid engagement or disengagement of an end cap or cover member with respect to the end of a hollow handle.

It is an object of the present invention to provide, for use in conjunction with a cordless electric device having a hollow handle which houses a slide-out battery pack, a detachable cover member that may be disengaged from the end of the open handle.

It is another object of the present invention to provide such a cover member that includes cam-actuated manually-manipulated locking means to facilitate a rapid engagement or disengagement of the cover member with respect to the handle.

It is yet another object of the present invention to provide a universal cover member that may be employed with a variety of cordless electric devices of the type having a hollow handle which normally receives a slide-out rechargeable battery pack.

It is a further object of the present invention to provide such a universal easily-detachable cover member that may be manufactured easily and economically from readily-available materials.

In accordance with the teachings of the present invention, there is illustrated herein a preferred embodiment, which is to be used in conjunction with a cordless electric device, as for example, a cordless hedge trimmer. The cordless hedge trimmer is provided with a hollow handle which normally houses a slide-out rechargeable battery pack. The handle has a substantially longitudinal axis and further has an open end, whereby the slideout battery pack may be easily inserted within the handle or quickly removed from the handle. A pair of oppositely-disposed recesses are formed within the handle on an axis substantially transverse to the longitudinal axis of the handle, the recesses being near the open end of the handle. A cover member is adapted to be inserted through the open end of the handle and to be received partially within the handle. The cover member has a continuous peripheral flange adapted to seat upon the open end of the handle when the cover member is received within the handle. Resilient means are carried by the cover member. The resilient means projects interiorly of the handle and engages the battery pack, thus making the battery pack "spring-loaded" within the hollow handle. Moreover, the cover member carries a manually-manipulatable locking spring which is on the side of the cover member opposite from the resilient means. The locking spring, which includes a pair of oppositely-projecting elements, has a raised position and a lowered position with respect to the cover member. In the lowered position of the locking spring, the spring engages a stationary locking post which is carried by the cover member, such that each of the elements of the locking spring projects radially beyond the cover member to engage a respective one of the oppositely-disposed recesses in the handle. Consequently, the cover member is detachably secured to the handle. On the other hand, when it is desired to detach the cover member from the hollow handle, the locking spring is brought to its raised position, thereby clearing the locking post and withdrawing the elements of the locking spring from the recesses in the handle; and thereafter, the cover member may be lifted out of the hollow handle so as to remove the slide-out battery pack.

These and other objects of the present invention will become apparent from a reading of the following specification, taken in conjunction with the enclosed drawings, in which:

FIGURE 1 is a side elevational view of a cordless electric device of the type which has a hollow handle adapted to receive a slide-out battery pack;

FIGURE 2 is an enlarged view of a portion of FIGURE 1 taken along the lines 2—2 of FIGURE 1, with parts broken away and sectioned to illustrate the hollow handle, the slide-out battery pack within the handle, and the cover member in its locking position within the handle;

FIGURE 3 is a view taken along the lines 3—3 of FIGURE 2, showing the front elevation of the cover member, and further showing the locking spring in its lowered position;

FIGURE 4 is a view taken along the lines 4—4 of FIGURE 2, showing how the oppositely-projecting elements of the locking spring project radially beyond the cover member so as to be received within a pair of oppositely-disposed dimpled recesses formed within the hollow handle, the recesses being formed along an axis which is substantially transverse to the generally longitudinal axis of the hollow handle;

FIGURE 5 is a partial exploded view of a portion of the hollow handle, showing the slide-out battery pack being removed from the handle, and further showing the locking spring of the cover member in its raised position to allow the cover member to be removed from the hollow handle;

FIGURE 6 is an enlarged view of a portion of FIGURE 4, showing the connection between the locking spring and the dimpled recesses in the handle; and FIGURE 7 is a view corresponding to that of FIGURE 6, but showing the locking spring in its raised position so that the oppositely-projecting elements of the locking spring are withdrawn from the respective dimpled recesses in the handle.

With reference to FIGURE 1, there is illustrated for background purposes, a cordless electric hedge trimmer 10 having a field case 11, an overhead handle 12, a key-type locking switch 13, a blade assembly comprising a moving blade 14 and a stationary blade 15, a gear case 16, and a hollow handle housing 17; but it will be appreciated by those skilled in the art that the techniques of the present invention are equally applicable to a wide variety of cordless electric devices of the type having a slide-out battery pack received within the hollow handle of the device.

With reference to FIGURES 2, 3, 4, and 5 the hollow handle 17, which may be substantially tubular and have a generally elliptical cross-section, is adapted to house a slide-out battery pack 18. Preferably, but not necessarily, the battery pack 18 comprises an assembly of one or more rechargeable energy cells. The energy cells, which for the purposes of the present invention may be considered as conventional, are formed from nickel-cadmium or other suitable materials. After the battery pack 18 has been slidably received within the hollow handle 17, an end cap or cover member 19 is inserted through the open end 20 of the hollow handle 17.

The cover member 19 comprises a substantially-flat base portion 21, a continuous raised wall portion 22 integral with the base portion 21, and a peripheral flange portion 23 formed as a continuation of the wall portion 22 and extending radially therefrom. Preferably, but not necessarily, the cover member 19 may be molded complete from a suitable plastic material. The base portion 21 of the cover member 19 has a hole 24 formed therein, and a locking post 25 is carried by the base portion 21 of the cover member 19. The locking post 25 may be made from a suitable metal and includes a rearwardly-projecting tubular portion 26 formed in the nature of a rivet member. Resilient means such as a leaf spring 27 is also carried by the cover member 19 on the side of the cover member 19 which is opposite from the locking post 25. In the preferred embodiment of the present invention, the tubular portion 26 of the locking post 25 passes through the hole 24 and the leaf spring 27 and thence is swaged-over so as to conveniently retain both the locking post 25 and leaf spring 27 to the base portion 21 of the cover member 19.

With further reference to FIGURES 2, 3, 4, and 5, the cover member 19 is formed with a pair of integral oppositely-disposed bosses 28 and 29 having respective recesses 30 and 31. Moreover, the cover member 19 carries a locking spring 32. The locking spring 32 has an upturned base portion 33, a pair of legs 34 and 35 emanating therefrom, and a pair of oppositely-projecting elements or feet 36 and 37 projecting substantially at right angles from the respective legs 34 and 35. The feet 36 and 37 are received within and are trapped within the respective recesses 30 and 31 of the respective bosses 28 and 29. Preferably, but not necessarily, the locking spring 32 is thus retained within the bosses 28 and 29 of the cover member 19 prior to the assembly of the locking post 25 and the leaf spring 27 to the base portion 21 of the cover member 19. Finally, the cooperate with the feet 36 and 37 of the locking spring 32, the hollow handle 17 is provided with a pair of oppositely-disposed dimpled recesses 38 and 39 (or equivalent holes) formed along an axis which is transverse to the longitudinal axis of the handle 17.

With reference to FIGURES 6 and 7, the utility and advantages of the present invention may be more clearly appreciated. The locking spring 32 has a lowered position, as in FIGURE 6, as well as a raised position as shown in FIGURE 7. The locking post 25 is intermediate the legs 34 and 35 of the locking spring 32 and is adapted to have a "camming" effect upon the legs 34 and 35, as the locking spring 32 is depressed to its lowered position. Consequently, as shown in FIGURE 6, the respective legs 34 and 35 of the locking spring 32 are spread apart, such that the feet 36 and 37 of the locking spring 32 project radially beyond the cover member 19 and are received within the respective dimpled recesses 38 and 39 formed in the handle 17. Hence, in the lowered position of the locking spring 32, the cover member 19 is detachably secured within the handle 17, thus holding the slide-out battery pack 18 within the handle 17, and thus maintaining a good electrical contact for the battery pack 18 within the cordless hedge trimmer 10.

When it is desired to remove the slide-out battery pack 18 from the handle 17, the upturned base portion 33 of the locking spring 32 is engaged by the finger of the operator and lifted by means of a slight manual effort, such that the legs 34 and 35 of the locking spring 32 clear the locking post 25. Because of the resilient nature of the locking spring 32, the respective feet 36 and 37 are withdrawn within the recesses 30 and 31 of the respective bosses 28 and 29, thus clearing the locking spring 32 and the feet 36 and 37 thereof, from connection with the respective dimpled recesses 38 and 39 formed in the handle 17. Thereafter, the cover member 19 may be easily lifted out of the hollow handle 17.

Conversely, when it is desired to secure the cover member 19 within the hollow handle 17, the cover member 19 is inserted partially within the handle 17 and manually depressed, such that the leaf spring 27 engages the battery pack 18, and such that the peripheral flange 23 of the cover member 19 rests upon the open end 20 of the hollow handle 17. Thereafter, the locking spring 32 is depressed by a slight manual effort such that the locking spring 32 is in its lowered position, substantially as shown in FIGURE 6, with the respective feet 36 and 37 of the locking spring 32 engaging within the dimpled recesses 38 and 39, respectively, of the handle 17. Consequently, the cover member 19 is locked to the handle 17, and the slide-out battery pack 18 is retained within the hollow handle 17.

The resilient nature of the locking spring 32, in combination with the camming effect between the locking post 25 and the legs 34 and 35 of the locking spring 32, results in a "snap action" which facilitates a rapid and convenient engagement, or disengagement, of the cover member 19 from the handle 17.

After the cover member 19 has thus been removed from the handle 17, the battery pack 18 may be slidably removed from the handle 17; and thereafter, if desired by the user, a new battery pack may be quickly inserted and retained within the handle 17 of the cordless electric hedge trimmer 10, while the "old" battery pack 18 is being recharged.

Obviously, many modifications may be made without departing from the basic spirit of the present invention; and therefore, within the scope of the appended claims, the invention may be practiced other than has been specifically described.

We claim:

1. In combination with a cordless electrical device having a battery in a housing formed with an open end having a continuous rim, a closure means for the housing, comprising:
   (a) a cover member received within the open end of the housing and seated against the rim of the housing;
   (b) a pair of mutually-aligned peripheral bosses formed on said cover member, each of said bosses having a bore therethrough;
   (c) a pair of recesses formed in the housing radially adjacent of said respective bosses of said cover member, said recesses communicating with said respective bores in said bosses;
   (d) a locking post secured to said cover member intermediate said bosses; and
   (e) a locking spring comprising a pair of legs straddling said post, a manually-manipulatable upturned base portion joining said legs, and a pair of outwardly-projecting feet, one on each leg;
   (f) said feet being journaled for radial sliding movement in said respective bores of said bosses, whereby said locking post forces said feet into said communicating recesses in the housing to latch said cover member to the housing, and whereby, when said locking spring is lifted, said legs clear said locking post to retract said feet in said bores and out of latching engagement with said recesses in the housing.

2. In combination with a cordless electrical device having a battery in a housing formed with an open end having a continuous rim, a closure means for the housing, comprising:
   (a) a cover having a base portion received within the open end of the housing and a radially-extending peripheral flange portion seated upon the rim of the housing;
   (b) said base portion of said cover member having resilient means secured thereto and engaging the end of the battery;
   (c) said cover member further having a recess formed therein;
   (d) a locking element carried by said cover member and journaled for radial sliding movement in said recess in said cover member;
   (e) a dimpled recess formed in the housing radially adjacent of said recess in said cover member and communicating therewith;

(f) means carried by said cover member and engaging said locking element to urge said locking element to a radially advanced position in said recess in said cover member and into said dimpled recess in the housing, thereby latching said cover member to the housing; and (g) manually-manipulatable means carried by said cover member to retract said locking element out of latching engagement with said recess in the housing.

References Cited by the Examiner
UNITED STATES PATENTS

| | | | |
|---|---|---|---|
| 1,230,086 | 6/17 | Carhart | 16—110.5 |
| 1,995,141 | 3/35 | Barber et al. | |
| 2,137,230 | 11/38 | Arden | 240—10.66 |
| 2,147,471 | 2/39 | Lyrrell et al. | 240—10.6 |

JOHN H. MACK, *Primary Examiner.*